United States Patent Office 3,442,562
Patented May 6, 1969

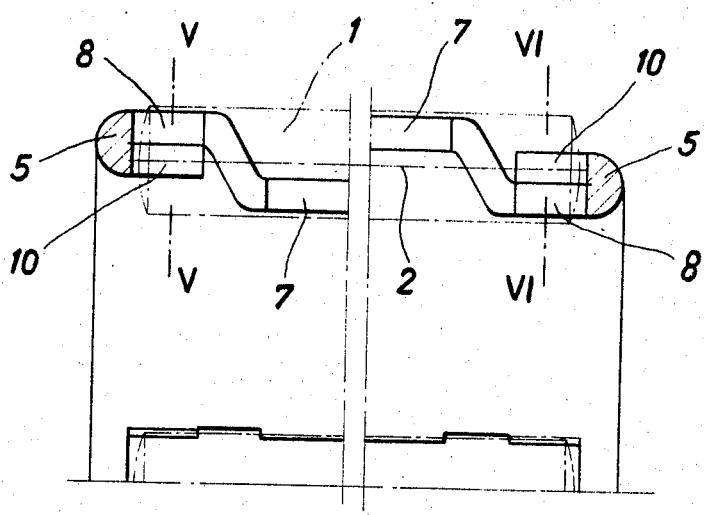
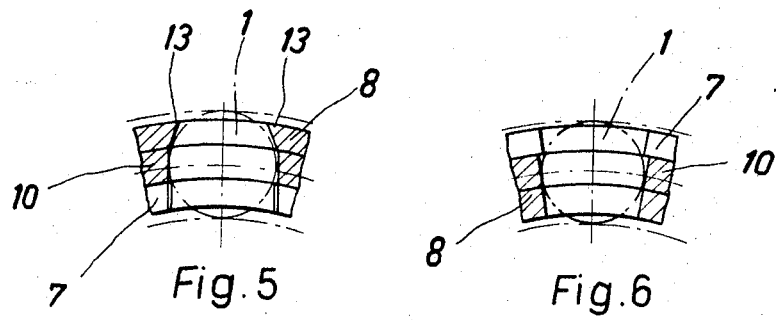

3,442,562
CAGE FOR CYLINDRICAL ROLLERS
Georg Schaeffler, Herzogenaurach, and Anton Teufel, Tubingen, Germany, assignors to Industriwerk Schaeffler OHG, Herzogenaurach, Germany
Filed Jan. 25, 1967, Ser. No. 611,772
Claims priority, application Germany, Feb. 17, 1966, J 30,093
Int. Cl. F16c 33/38
U.S. Cl. 308—217                               3 Claims

ABSTRACT OF THE DISCLOSURE

A cage for cylindrical rollers, particularly needle bearings, in which the bars of the cage which connect the two end flanges with one another and which are offset in the vicinity of their center, guide the rollers in the pitch circle, and in which the bar portions which run inside and outside of the pitch circle, retain the rollers in both radial directions.

Prior art

One type of cage is already known wherein the roller guidance is effected in the pitch circle, but those bar portions which guide the rollers run diagonally in the vicinity of the pitch circle of the rollers and connect to one another the other bar portions which are disposed inside and outside of the pitch circle running in axial-parallel direction and which support the rollers in both radial directions. In this type of construction, the guiding surface defining the diagonally disposed bar portions is relatively very small. Therefore, the stress at this contact point is considerably great which has the disadvantage that the rollers are apt to abut against those bar portions which run in radial direction inside and outside the pitch circle after a short period of operation. This condition, in turn, can cause the rollers to roll over the said bars which leads to the destruction of the entire bearing.

Another known cage construction consists of a thin-walled cage formed without cutting. This cage is comprised of bar portions which run in axial-parallel direction inside and outside of the pitch circle and bar portions running in axial-parallel direction which are arranged in the pitch circle and guide the rollers. By the arrangement of these additional bar portions running in axial-parallel direction in the pitch circle, a larger guiding surface is obtained so that the stress at this contact point is far less in comparison with the previously indicated construction. However, these bar portions have only a very small extension in the radial direction due to to the utilization of thin-walled material so that in spite of the greater length of these bar portions only a relatively small guiding surface is made available. Since it is not possible or only at considerable cost to construct the cage accurately at the contact points which assume its guidance with regard to the roller raceway, the cage will always show a certain so-called sag in relation to the roller raceway and the axial-parallel bar portions which effect the guidance of the rollers come to lie inside and outside of the pitch circle during a specific extent of their cycle. In this case, the guidance of the rollers occurs substantially at the edges of these bar portions. Thereby the stress is still more intensified and, moreover, the lubricant is scraped off from the roller surface. Furthermore, due to the slight radial thickness of those bar portions which guide the rollers, no lubricant reservoir can develop by which a supporting lubricating film could be built up.

Objects of the invention

It is an object of the invention to provide an improved cage for cylindrical rollers in which the rollers are guided in an optimum manner.

It is a further object of the invention to provide a cage for cylindrical rollers wherein the portion of the cage guiding the rollers has a greater width in a radial direction than the cage portion supporting the rollers.

These and other objects and advantages of the invention will become obvious from the following detailed description.

Description of the invention

The cage of the invention for cylindrical rollers, particularly needle bearings, is comprised of two end rings or flanges connected with each other by a plurality of cross bars offset in the vicinity of their center to provide cross bar portions inside and outside of the pitch circle to retain the rollers in both radial directions and the cross bar portions which guide the rollers and which are arranged in the vicinity of the cross bar ends passing inside and outside of the pitch circle have a greater radial width than the cross bar portions which support the rollers.

In one modification of the invention, the cage may be made of a thin-walled material such as sheet metal and is formed without cutting. The bar portions of the cages passing through the pitch circle to guide rollers may be formed by bending over the cross bar ends and the end flanges at 180°. This type of cage can be made from a thin-walled cylinder. However, it is also possible to punch out the apertures for the rollers in a primarily flat band of sheet metal, profile the cross bars and then bend the flat band into a cylindrical form and connect the band at the joint points by appropriate means. In this construction, the folding over of the cross bar ends and end rings is preferably effected before bending the band into a cylindrical form.

The construction of a small cage results in a still different characteristic of the invention when the cross bar portions supporting the rollers are disposed in the cross bar ends radially inside or outside of the cross bar portions which effect the roller guidance. This arrangement has the advantage that specific means to retain the rollers in a radially inward direction are not required. By curving the originally flat strip, the relative distances between the bar portions present in the pitch circle become smaller, so that in this way a mounting support is obtained. Prior to the bending of this flat strip, these bar portions have an oppositely directed spacing which can be just as great as the opposite spacing of the cross bar portions effecting the guidance of the rollers, which is slightly greater than the diameter of the rollers.

According to the cage of the invention, the rollers are guided at their axial terminals so that a crossing over of the rollers is definitely and assuredly prevented. Also, those cross bar portions effecting the roller guidance have large enough axial and radial direction measurements to limit the resulting wear and tear to a minimum. Moreover, at a sag of the cage an applicable lubricating film can now be developed, since a sufficient lubricating reservoir can be obtained due to the large radial expansion. Finally, the invention permits the construction of a thin-walled cage by a working process entirely without cutting. Also, the obtaining of thicker bar portions at the bar ends is rendered possible in a simple manner by bending the cage material over at 180°.

Referring now to the drawings:

FIGS. 3 and 4 are partial cross-sectional views of different embodiments of the cage of the invention.

FIG. 5 is a cross-sectional view of FIG. 3 along the line V—V.

FIG. 6 is a cross-sectional view of FIG. 4 along the line VI—VI.

Figure 1:
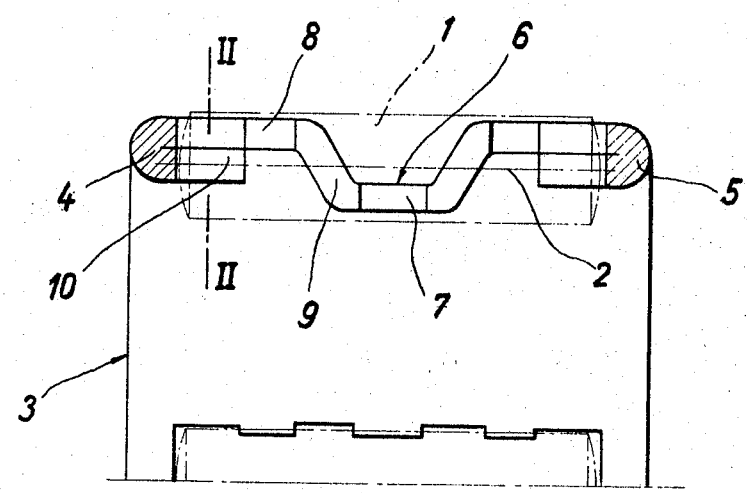
FIG. 1 is a partial cross-sectional view of one cage embodiment of the invention.
Figure 2:
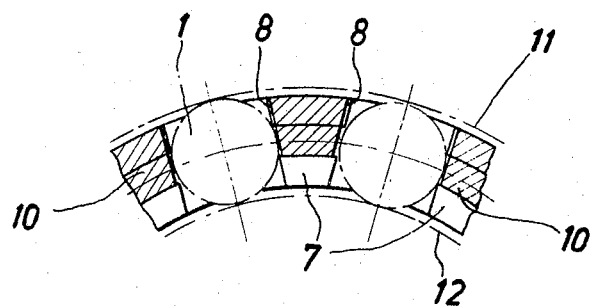
FIG. 2 is a cross-sectional view of FIG. 1 along the line II—II.

In FIG. 1, the roller 1, shown by dot-dash lines and having a pitch circle 2 passing through its center, is in cage 3. Cage 3 is comprised of two end flanges 4 and 5 which are connected with each other by cross bars 6. The cross bars 6 are subdivided into individual bar portions and are offset radially inwardly with respect to the cylindrical cage. Each crossbar includes a projection 7 on the offset section and projections 8 on the section which lies in the same plane as the cylindrical cage which extend into the pockets defined therebetween. The distance between the edges of the projections 7 and 8 is less than the diameter of the rollers to be mounted in the cage. The flanges 4 and 5 on the end rings of the cage are reentrantly folded to a juxtaposed position with said crossbars and include openings 10 which are aligned with the roller receiving pockets. From FIG. 2 in which dotted lines 11 and 12 indicate the outer and inner raceways, respectively, it is thus apparent that the rollers 1 are rotatably retained in their respective pockets by the projections 7 and 8 on the crossbars which project above and beneath each roller.

In FIG. 3, the bar portions 8, which support the rollers in the radially outward direction, are arranged in the vicinity of the bar ends in radially outwardly relation to bar portions 10 which guide the rollers. As can be seen in FIG. 5, bar portions 8 are provided with projections 13 formed on without cutting which effect the mounting support of the rollers. In this type of cage construction, no distinct definition exists between the bar portions 10 which guide the rollers and the bar portions 8 which support the rollers.

In FIG. 4, the bar portions 8 are arranged radially inside the pitch circle and the bar portions 7 are arranged outside of the pitch circle. This embodiment of the cage is produced by punching out the pockets intended to accommodate the rollers in a flat band and then the bars are profiled. Thereafter, the band is bent over into a cylindrical form so that bar portions 8 will be disposed radially inside of the pitch circle. The punched out pockets in the still flat band in the vicinity of the bar portions 7 have a width which is smaller than the diameter of the rollers, while the width of the pockets in the vicinity of the bar portions 10 or 8 conforms to the diameter of the rollers. However, upon bending the material into the cylindrical form, the relative distance between the bar portions 8 is narrowed to such a degree that a mounting support for the rollers in radially inwardly direction thereby results.

Figure 7:
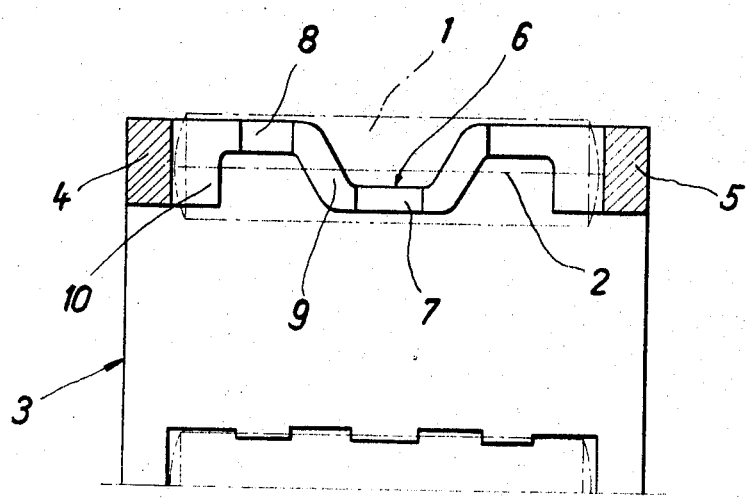
FIG. 7 is a cross-sectional view of a cage embodiment similar to the cage of FIG. 1 except it is a miniature size construction.

FIG. 7 illustrates a cross-section view of the cage similar to that in FIG. 1 and identical cage segments are indicated with identical numbers. Preferably the cage is constructed of a thick-walled casing, into which the desired profile of the bars is worked by machining.

Various modifications of the cage of the invention may be made without departing from the spirit or scope thereof.

We claim:

1. A one-piece cage prepared by deformation without machining of thin-walled material for cylindrical rollers comprising cross-bars interconnecting two end rings defining roller receiving pockets therebetween, said cross bars including a section offset radially inwardly in a plane beneath the pitch circle defined by the axis of the rollers when mounted thereon, bearing projections on said cross bars on both sides of said pitch circle which define dimensions therebetween less than the roller diameter for retaining said rollers in said pockets, flanges integrally formed on said end rings reentrantly folded to a juxtaposed position with respect to each of said cross-bars on both ends thereof to provide bearing surfaces for guiding said rollers.

2. A cage according to claim 1 wherein the flanges underlie said crossbars and the pitch circle.

3. A cage according to claim 1 wherein the flanges overlie said crossbars and the pitch circle.

References Cited

UNITED STATES PATENTS 3,228,090   1/1966   Schaeffler _____ 308—217

FOREIGN PATENTS 1,234,778   5/1960   France.

MARTIN P. SCHWADRON, *Primary Examiner.*

F. SUSKO, *Assistant Examiner.*